J. X. MILLS.
Portable Feed-Racks.

No. 157,692.    Patented Dec. 15, 1874.

Witnesses:
J. Carry Coleman
J. R. Nottingham

Inventor
Job X. Mills
by his attys
Cox & Cox

UNITED STATES PATENT OFFICE.

JOB X. MILLS, OF PINE VILLAGE, INDIANA.

IMPROVEMENT IN PORTABLE FEED-RACKS.

Specification forming part of Letters Patent No. 157,692, dated December 15, 1874; application filed September 12, 1874.

*To all whom it may concern:*

Be it known that I, JOB X. MILLS, of Pine Village, Warren county, Indiana, have invented certain new and useful Improvements in Feed-Racks, of which the following is a specification, reference being had to the accompanying drawings.

The invention relates to an improvement in feed-racks; and consists in a receptacle to hold liquid or semi-liquid food, above which are provided two frames, swinging on axles, and so constructed that, when secured in position, the arms on their lower edges serve as a feed-rack, which can be arranged at any angle to adapt it to the various kinds of food, and be emptied readily by withdrawing the supports retaining the frames, which allows them to swing apart.

The body of the frame is constructed solidly, so as to prevent the escape of small grain or particles of the food.

The device is mounted upon runners or other means of transportation.

The object of the invention is to provide a convenient device for feeding liquid or solid food to stock.

Figure 1:
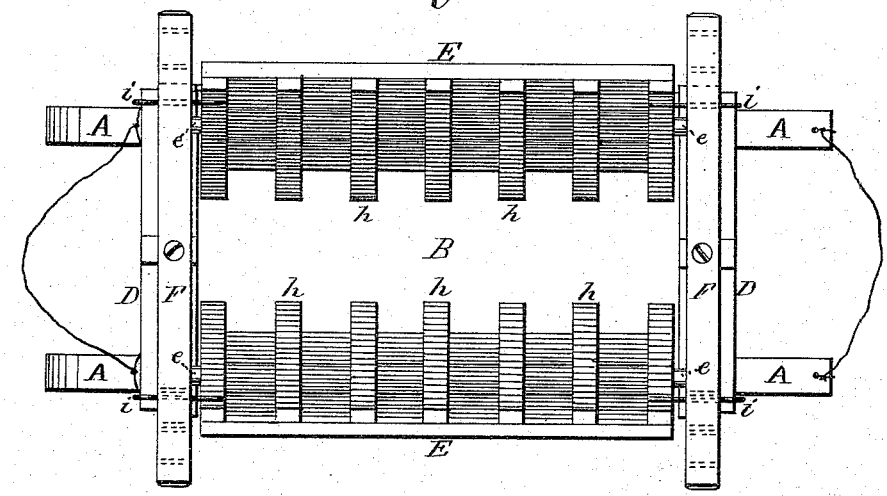
Figure 2:
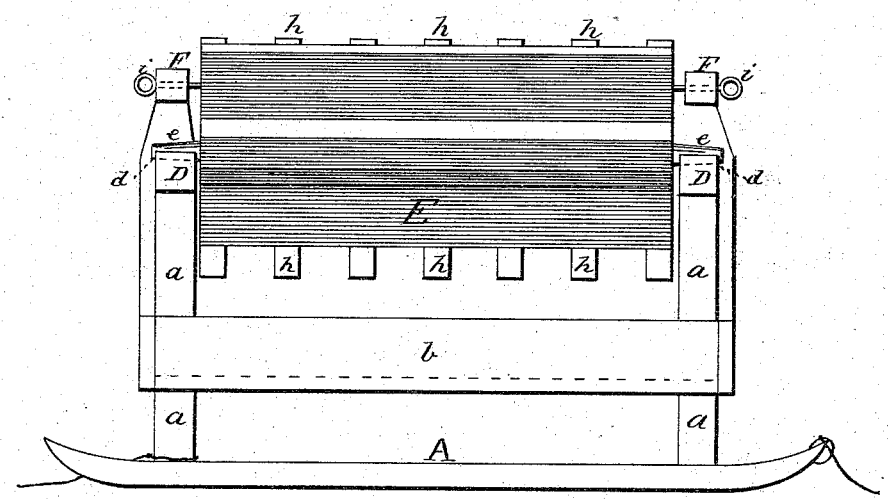

Figure 1 is a top or plan view of a device embodying the elements of the invention. Fig. 2 is a side elevation of same.

A in the accompanying drawings are runners, having the four uprights $a$, to which are secured, at a proper distance above the runners, the boards $b$, having between their lower edges the bottom B, with which they form a receptacle for liquid or semi-liquid food, and also a means of receiving such particles of food as may escape from the rack above. This receptacle is placed at such height above the ground as to be readily accessible to small stock. The uprights $b$ are connected at their upper ends by the bars D, in which are provided the apertures $d$ to receive the axles $e$ on the edges of the frames E, which are composed of a solid portion of boards, and have the cleats $h$ secured thereon, the lower ends of the cleats extending below the lower edge of the solid parts of the frames, which are placed opposite each other, with the cleats $h$ inside, thus forming a rack which can readily be adapted to any-sized solid food, by swinging the frames apart and securing them in position by means of the pins $i$, passing through apertures properly and correspondingly placed in the bars F, which cross the ends of the device above the upper ends of the uprights $b$.

The rack formed by the frames E may be easily emptied by swinging the lower edges thereof apart.

Large stock, such as cattle and horses, can feed from above out of the rack formed by the frames E. Sheep and small stock can feed through the rack formed by the cleats, or out of the receptacle formed by the bottom B and boards $b$.

The purpose of the cleats is to form a rack below the lower edge of the solid parts of the frames E.

What I claim as my invention, and desire to secure by Letters Patent, is—

The frames E, composed partly of solid surface, and provided with the cleats $h$, and swinging upon the axles $e$, in combination with the receptacle formed by the boards $b$ and bottom B, when mounted upon a suitable means of transportation, substantially as shown and specified.

In testimony that I claim the foregoing improvements in feed-racks, as above described, I have hereunto set my hand and seal this 29th day of August, 1874.

JOB X. MILLS. [L. S.]

Witnesses:
WM. C. MILLS,
JOHN W. FREEMAN.